Patented Oct. 19, 1926.

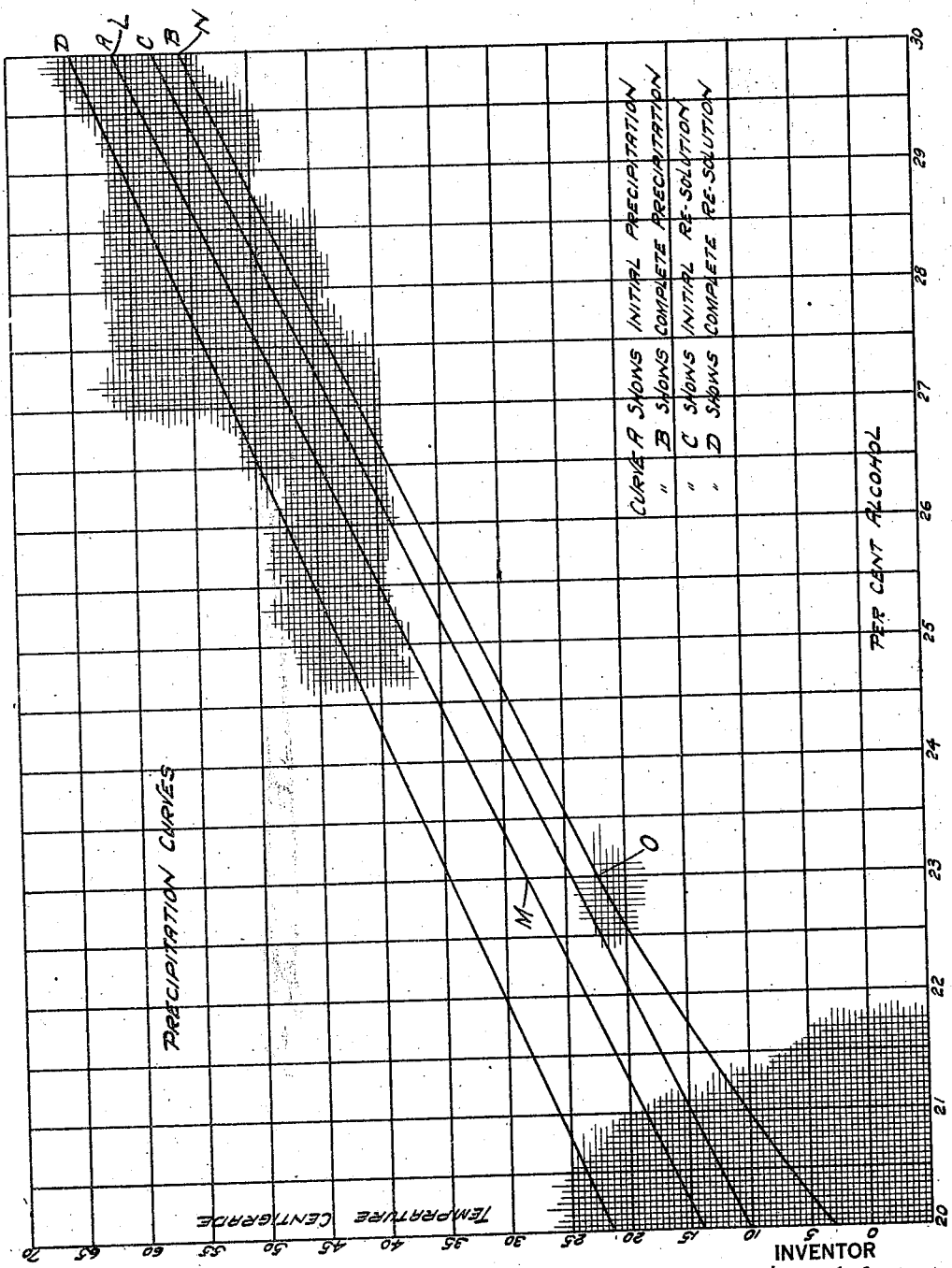

1,603,335

UNITED STATES PATENT OFFICE.

JAMES M. GILLET, OF MILWAUKEE, WISCONSIN, ASSIGNOR TO THE GOODYEAR TIRE & RUBBER COMPANY, OF AKRON, OHIO, A CORPORATION OF OHIO.

METHOD OF MAKING A RUBBERIZED FIBER COMPOSITION.

Application filed July 31, 1922. Serial No. 578,786.

My invention relates to the method of making a rubberized fiber composition which may be utilized in a variety of capacities, such as for floor or wall coverings, as a substitute for leather, or for any purpose to which a tough, flexible porous, water-resistant body may be adapted.

More particularly, my invention relates to that portion of the method designated in which rubber is precipitated from a solution, either upon a mass of fibers suspended and dispersed in said solution or from a solution free from any suspended matter.

My invention particularly contemplates precipitating rubber from a liquid containing rubber in solution by controlling the temperature of said liquid.

Heretofore, it has been customary to precipitate rubber from solution, such, for example, as toluol or benzol, by the addition of a precipitating agent, such as alcohol. While the rubber may be successfully precipitated by this method, the amount of alcohol necessary to produce complete precipitation, within a sufficiently short time for commercial purposes, is relatively large. Furthermore, after the rubber has been precipitated, there remains a liquid which is a mixture of benzol and alcohol, and a small amount of the constituents of rubber which are soluble in alcohol.

As it is necessary to dissolve the rubber before it can be precipitated in any desired manner, the solution remaining after the previously described process has been completed, cannot be utilized again for the same purpose on account of the high percentage of alcohol added to produce precipitation and which prevents the dissolution of the rubber. It is, therefore, necessary either to use fresh benzol and alcohol, which would be very expensive on account of the large quantities employed, or to separate the solvent from the precipitating agent, the cost of which is also a material item.

By my invention I have overcome the necessity of adding to the solution any agent tending to produce precipitation other than a relatively small quantity of alcohol, which may be added during the mixing process and which does not prevent the proper dissolution of the rubber in the benzol so long as the liquid is maintained at the proper temperature. By properly controlling the temperature of the liquid, precipitation is produced in any desired degree and, within certain limits, in any desired interval of time. Thus, at the completion of the process the remaining liquid retains the same proportions of solvent and precipitant as were present during the process of dissolution of the rubber, so that the remaining liquid may be used repeatedly without being materially altered.

In practising my invention, I prepare a liquid comprising a relatively large quantity of benzol, or other rubber solvent, and a relatively smaller quantity of alcohol, or other rubber precipitant. To this liquid a suitable quantity of rubber cement is added, which is dissolved therein. A quantity of fibers, either of cotton, hemp, manila, jute, asbestos, wood or the like, is then added to the liquid and is beaten and separated so as to curl and fray the ends thereof, the beating action serving to thoroughly mix and disperse the fibers throughout the liquid. While the rubber is mentioned as being added to the solution prior to the addition of the fibers, it might equally well be added subsequently thereto. All ingredients necessary for the preparation of the material have now been added, and all at approximately the same time. The mixture is maintained at a temperature above a critical point, which varies with the relative quantities of solvent and precipitant present, until the rubber is thoroughly dissolved. The temperature of the mixture is then lowered to produce precipitation. By properly regulating the rate of change of the temperature, the period of time required for complete precipitation may, within certain limits be controlled at will, and be made of sufficiently short duration for commercial purposes.

As an example, if 1152 cc. of toluol is mixed with 448 cc. of alcohol, and has added thereto 8 gr. of rubber and 8 gr. of fibers, the rubber will be readily dissolved at about 62° C. or above. If the temperature of the mixture is then lowered, while being stirred gently, to about 25° C. the rubber is precipitated upon the individual fibers, forming a coating thereon. The coated fibers are then strained out of the solution on a screen, washed with a small quantity of alcohol, pressed and dried. The resulting mat is then cured under pressure at a relatively high temperature.

Thus, the only change made during the process is in the temperature of the mixture. The liquid remaining after the fibers and precipitated rubber is removed therefrom, consists of the same relative proportions of solvent and precipitant as when first used. The solution may, therefore, be used again and again. Approximately 215 cc. of fresh liquid must be added for each new mat, of the size in question, this amount being necessary to keep the total at 1600 cc., the original amount.

The relative quantities of precipitant and solvent determine the temperature at which the mixture should be maintained to produce dissolution of the rubber or precipitation thereof. This relation is indicated in the accompanying drawing, which relates to a toluol-alcohol solution. As indicated by the legends, curve A represents the temperatures, for the various solutions at which precipitation starts. Curve B represents the various temperatures at which complete precipitation occurs. Curve C represents the various temperatures at which initial re-solution occurs. Curve D represents the temperatures at which complete re-solution occurs.

It will be noted that in the tests recorded, the curve representing initial precipitation does not correspond to that representing complete re-solution, nor does the curve representing complete precipitation coincide with that representing initial re-solution. These apparent differences are believed to be caused by the lack of proper agitation during the re-solution process.

By these curves, it is possible to determine what amount of alcohol may be used without precipitating the rubber at any given temperature, or to determine what temperature is necessary to either dissolve or precipitate the rubber when the percentage of alcohol present is known.

By utilization of the aforementioned process, several advantages accrue, of which the most important is the fact that approximately 87% of the liquids used for making one mat may be used in making the next mat without any preparation or separation thereof, whatsoever. Another advantage is that, since all the necessary ingredients are mixed together at one time, the fibers become thoroughly and equally dispersed throughout the entire liquid and a uniform precipitation of rubber on the fiber is secured, local high concentration of alcohol is avoided, and the amount of alcohol necessary is materially reduced.

An inspection of the drawing indicates that the relation of any one set of correlated temperatures and percentages, such, for example, as the initial precipitation temperatures to the corresponding percentages of alcohol in the solution, may be represented by an equation which will permit the user to determine the necessary temperature to produce precipitation provided the percent of alcohol present is known, or vice versa. Using the two point straight line equation, applied to the initial precipitation curve, after assuming two points L and M. Let $x$=percentage of alcohol in solution and $y$=degrees of temperature centigrade, let the point L be represented by $x_2$ and $y_2$, representing respectively 30% alcohol solution and 61° centigrade, and let the point M be represented by $x_1$ and $y_1$ representing respectively 23% alcohol solution and 28° centigrade.

$$\frac{y-y_1}{y_2-y_1} = \frac{x-x_1}{x_2-x_1}$$

$$\frac{y-28}{61-28} = \frac{x-23}{30-23}$$

$$7y-33x=-563$$

By substituting either $x$ or $y$, that is, the percentage of alcohol present or the initial precipitation temperature, the corresponding unknown may readily be calculated. In a similar manner the points N and O may be used to secure a similar equation relating to the complete precipitation curve. This equation becomes $$7y-33x=-605$$

Thus for any given percentage of alcohol, in order to bring about dissolution of the rubber and in order to prevent precipitation thereof, the solution should be maintained above the temperature Y calculated by substituting the percentage of alcohol for $x$ in the equation $$7y-33x=-563$$

Also to insure complete precipitation the solution should be maintained below the temperature Y calculated by substituting the percentage of alcohol for X in the equation $$7y-33x=-605.$$

It is, of course, obvious that rubber may be dissolved into a solution containing both a solvent and a precipitant by raising the temperature of the solution above a critical point, so that the present invention may be used to obtain dissolution of the rubber as well as precipitation.

Though I have referred, throughout this specification and in the attached claims to toluol as the solvent of rubber used and to alcohol as the precipitant, it is of course, understood that I may use benzol, gasoline or the like as solvent and acetone or the like as a precipitating agent.

Although I have described in detail but a single application of my invention, it will be obvious to those skilled in the art that it is not so limited, but that various modifications and changes may be made therein without departing from the spirit and scope of the appended claims.

What I claim is:

1. The method of controlling the precipitation of rubber in solution which comprises regulating the temperature of said solution.

2. The method of effecting the precipitation of rubber out of a mixture containing rubber in solution which comprises lowering the temperature of said solution.

3. The method of controlling the rate of precipitation of rubber out of a mixture containing rubber in solution which comprises controlling the temperature of said solution.

4. The method of controlling the precipitation of rubber in a solution comprising a rubber solvent and a rubber precipitating agent which comprises regulating the temperature of said solution.

5. The method of treating a mixture embodying rubber which comprises maintaining the temperature of the solution at a sufficiently high degree of temperature to effect dissolution of said rubber and subsequently to a relatively lower degree of temperature to effect precipitation of said rubber.

6. The method of controlling the precipitation of rubber in a toluol-alcohol solution which comprises controlling the temperature of said solution.

7. The method of effecting the precipitation of rubber out of a toluol-alcohol solution which comprises reducing the temperature of the solution below a critical point, said point being determined by the relative proportions of alcohol and toluol present in the solution.

8. The method of treating fibers which comprises beating the fibers in a solvent-precipitant liquid containing rubber, which liquid dissolves said rubber when raised above a predetermined critical temperature and causes said rubber to be precipitated upon said fibers when reduced below a predetermined critical temperature said point being determined by the relative proportions of solvent and precipitant present in the liquid.

9. The method of treating fibers which comprises immersing the fibers in a liquid containing rubber, a rubber solvent and a rubber precipitating agent, beating said fibers in said solution, and lowering the temperature of said solution to effect precipitation of the rubber on the fibers.

10. The method of making a mat which comprises mixing together a quantity of fibers, a quantity of rubber, a rubber solvent and a rubber precipitating agent, maintaining said mixture at a sufficiently high temperature to dissolve the rubber and subsequently lowering the temperature of said mixture until the rubber is precipitated from said solution upon said fibers.

11. The method of making a fibrous mat which comprises mixing a quantity of fiber having curled and frayed ends and a quantity of rubber compound in a solution of toluol and alcohol, maintaining said solution above a sufficiently high degree of temperature to dissolve the rubber and subsequently lowering the temperature of said solution until the rubber is precipitated upon said fibers.

12. The method of treating a solution comprising approximately 25% rubber precipitant and approximately 75% rubber solvent, which comprises mixing a quantity of rubber therewith, maintaining said solution above approximately 45° C. to produce dissolution of the rubber and reducing said solution below approximately 30° C. to produce precipitation of the rubber out of the solution.

13. The method of treating a rubber solution comprising toluol and alcohol which comprises effecting dissolution of the rubber by raising said solution above a temperature represented approximately in degrees centigrade by Y in the equation $$7y - 33x = -563$$

in which $x$ represents percent alcohol in solution and effecting precipitation of the rubber out of the solution by reducing said solution below a temperature represented approximately by Y in the equation $$7y - 33x = -605$$

14. A method of making rubberized fibrous composition that comprises treating rubber with a solvent, mixing a fibrous material therewith and precipitating the rubber by chilling the suspension.

15. A method of making rubberized fibrous composition that comprises dissolving rubber in a fluid exhibiting a solvent action at elevated temperatures, incorporating a fibrous material therewith and chilling the suspension.

16. A method of making rubberized fibrous composition that comprises dissolving rubber in a mixture of alcohol and toluol, possessed of solvent properties at elevated temperatures, incorporating a fibrous material therewith and chilling the suspension.

In witness whereof, I have hereunto signed my name.

JAMES M. GILLET.